Figure 1:
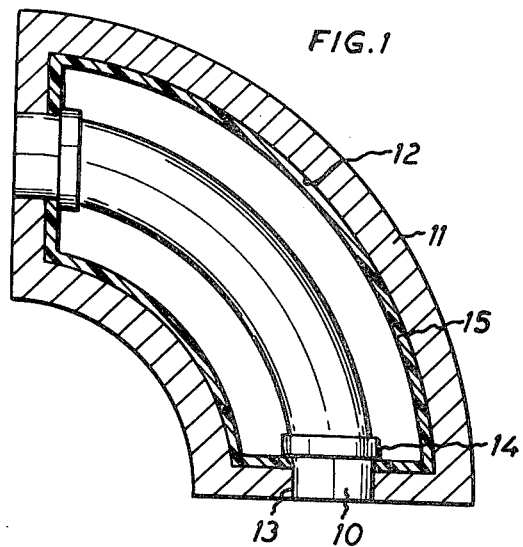

United States Patent [19]

Kristensson et al.

[11] Patent Number: 4,485,057
[45] Date of Patent: Nov. 27, 1984

[54] METHOD OF PRODUCING INSULATED PIPELINE COMPONENTS

[75] Inventors: Olle Kristensson, Lycksele; Bo R. G. Nyström, Vindeln, both of Sweden

[73] Assignee: Lindab Nord AB, Lycksele, Sweden

[21] Appl. No.: 466,862

[22] Filed: Feb. 16, 1983

[30] Foreign Application Priority Data

Feb. 23, 1982 [SE] Sweden .................... 8201114

[51] Int. Cl.³ .............................. B29D 27/04
[52] U.S. Cl. .................... 264/45.7; 264/46.6; 264/46.7; 264/46.9
[58] Field of Search ............ 264/45.7, 46.6, 46.9, 264/46.7

[56] References Cited

U.S. PATENT DOCUMENTS

| | | | |
|---|---|---|---|
| 3,258,512 | 6/1966 | Flower et al. | 264/46.9 |
| 3,359,351 | 12/1967 | Bender | 264/46.9 |
| 3,394,207 | 7/1968 | Andersen | 264/46.9 X |
| 3,426,110 | 2/1969 | Kesling | 264/46.6 X |
| 3,505,137 | 4/1970 | Kliene | 264/46.6 X |
| 4,009,732 | 3/1977 | Martin et al. | 264/46.9 X |
| 4,049,480 | 9/1977 | Kutschke | 264/46.9 X |
| 4,158,686 | 6/1979 | Boeckmann | 264/45.7 |
| 4,276,245 | 6/1981 | Ault | 264/46.9 X |
| 4,384,905 | 5/1983 | Gros | 264/46.9 X |

FOREIGN PATENT DOCUMENTS 47-47092  11/1982  Japan .................. 264/46.9

*Primary Examiner*—Philip Anderson
*Attorney, Agent, or Firm*—Burgess, Ryan & Wayne

[57] ABSTRACT

Insulated pipeline components are produced by positioning a steel pipe in the cavity of a casting mold with the pipe ends protruding therefrom. The dimensions of the cavity are greater than those of the inner pipe, and in the space between the inner pipe and the contact surfaces of the mold cavity a plastic powder is introduced, the powder being melted by heating of the mold. The mold is then rotated in a manner well known in rotational molding technique so that centrifugal force drives the molten plastic material against the contact surfaces of the mold cavity to form a plastic jacket; and after the mold has cooled the component is removed and expandable plastic material is supplied to the space between the inner pipe and the plastic jacket and is foamed. The resulting component has an exactly centered inner pipe, lacks conventional joints and can be produced at relatively low cost in a manner complying with industrial safety requirements.

4 Claims, 2 Drawing Figures

METHOD OF PRODUCING INSULATED PIPELINE COMPONENTS

The present invention relates to a method of producing insulated pipeline components consisting of a fluid-conducting inner pipe, preferably of steel, an outer casing of rigid plastic, for instance polyethylene, and an intermediate insulating layer of foamed plastic material, for instance polyurethane foam.

Pipelines in district heating systems consist both of straight pipe elements and of components in the form of elbows, tees, reducing pieces, crosses, expansion pipes etc., all of which have an inner pipe of steel, an outer pipe of rigid plastic and an intermediate insulation of expanded material. While the straight pipe elements are readily manufactured, production of the other components is not an easy matter. For example, an insulated elbow is manufactured by dividing a curved rigid plastic pipe with a diameter much larger than that of the steel pipe into three or more segments which are then pushed onto the steel pipe and again joined together, for instance by polyfusion or extrusion welding. The steel pipe is then centered as exactly as possible within the plastic pipe, and the ends of the plastic pipe are sealed, whereupon the space between the steel pipe and the plastic pipe is filled with polyurethane. Pipe components manufactured in this manner suffer from several disadvantages. First of all, their production is difficult because of the complicated welding of the segments or the like, and frequently leakage occurs at the joints during subsequent use. It is also difficult to center the inner pipe within the jacket; and last but not least the final insulation with polyurethane foam is unsatisfactory with respect to industrial safety requirements. Production of these components thus is difficult and therefore expensive, while at the same time the quality often is not entirely satisfactory.

It is an object of the present invention to obviate the above-mentioned disadvantages of insulated pipeline components and to produce, in a simple manner, better and less expensive components. This is achieved by centering the inner pipe in the mold cavity of a two-part mold with the pipe ends protruding therefrom, charging the mold cavity whose dimensions are greater than those of the inner pipe, with rigid plastic powder, closing the mold and heating it to melt the plastic powder and then rotating the mold in a manner well known in rotational molding technique to produce a plastic layer around the contact surfaces of the mold cavity, removing the inner pipe and the surrounding plastic jacket from the mold after the mold has cooled, and supplying the expandable plastic material to the space between the inner pipe and the jacket where it is expanded in known manner.

Figure 2:
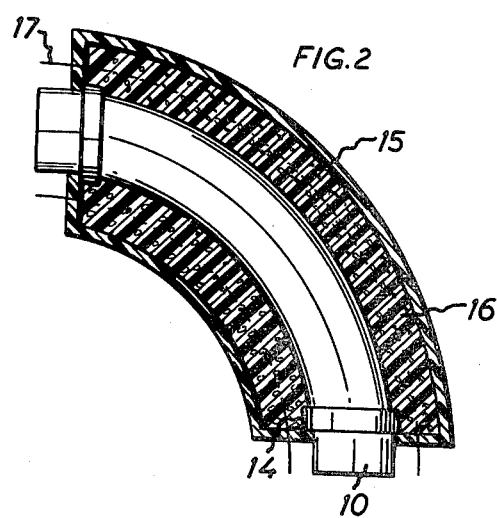

The invention will be described in more detail below, reference being had to the accompanying drawing in which:

FIG. 1 illustrates schematically a mold for the production of a pipeline component in the form of an elbow; and FIG. 2 shows a section of the finished pipe component.

An insulated elbow for a pipeline in a district heating system is produced by means of a two-part mold, one mold part of which is designated 11 in FIG. 1. The mold part 11 has a cavity 12 for accommodating the fluid-conducting inner pipe 10 of steel. As will appear from FIG. 1, the cavity 12 has a much greater radius than the inner pipe 10, but is shorter than the pipe so that mold end walls are formed which have a central recess 13 of the same radius as the inner pipe 10. The pipe 10 thus can be positioned in the mold part 11 with its ends resting in the semicircular recesses 13 of the mold end pieces. Although FIG. 1 shows the end faces of the pipe 10 flush with the outer side of the end walls, the pipe end faces may, if desired, also extend beyond this surface. The recesses in the end walls of the mold 11 tightly surround the pipe, and if necessary it is, of course, also possible to provide a sealing material around the pipe end portions at the point where they extend through the mold end walls so that the cavity 12 will be sealed towards the atmosphere. When the inner pipe 10 thus has been placed in the mold part 11 and the mold is closed by bringing the mold part 11 together with an identical part, the inner pipe 10 will be exactly centered in the mold cavity 12. Before the pipe is placed in the cavity, a ring 14 of some suitable material, for instance paper or aluminum, preferably is disposed about a portion of the pipe which lies at some distance from the point where the tube 10 projects from the mold cavity 12, such that a narrow gap is formed between the ring 14 and the inner surface of the mold end walls. The rings 14 may be formed by a foil wrapping, or by passing resilient means onto the pipe. Before the mold is closed, a predetermined amount of rigid plastic powder is introduced into the cavity 12. The term "rigid plastic" is here used for any type of plastic suitable for the production of a relatively rigid outer jacket capable of withstanding mechanical stresses and chemical attack. A suitable material is polyethylene. After the mold has been closed, it is heated, for instance by means of heating coils (not shown) in the mold itself, or by placing the mold in an oven so that the plastic powder within the mold cavity 12 will melt. The mold is then rotated in different planes in a manner well known in rotational molding technique, whereby the molten plastic flows out and covers the contact surfaces of the mold cavity 12, as shown in FIG. 1. The rings 14 serve to prevent the molten plastic from leaving the space adjacent the mold end walls along the pipe. After rotational molding, the mold is cooled, for instance by means of cooling passages (not shown), and when the mold is sufficiently cool, it can be opened and the inner pipe 10 which now is provided with a plastic jacket 15, can be removed. As has been pointed out before, this technique ensures that the pipe 10 will be exactly centered within the jacket 15, which is important in order to prevent undesired heat losses later on. Furthermore, the rotational molding gives a whole jacket without joints and of uniform wall thickness.

The component thus produced must now be insulated, and this is done by making one or more holes in the plastic jacket, preferably in one of its end wall portions. An expandable material, preferably expandable polyurethane, is now injected through the hole or holes and is caused to expand in the space between the inner pipe 10 and the jacket 15 in conventional manner. The injection hole or holes are then sealed. It should be stressed that, by the method according to the present invention, the in many respects complicated and hazardous insulation of the pipe component with expandable plastic can be carried out entirely without risk and in a manner complying with industrial safety requirements. The pipe component is now ready for connection in a pipeline system.

In many instances, it is desired to provide alarm wires 17 for sensing a possible infiltration or leakage of liquid in the insulation and activating a signalling device in the insulation layer, which is easily done by placing the wires in the mold together with the inner pipe 10, whereby the plastic material during the subsequent rotational molding will tightly surround the wires at the points where they project from the plastic jacket.

The drawing illustrates the production of an insulated elbow, but it will be appreciated that also all other insulated components of a pipeline, such as tees, reducing pieces, crosses, expansion pieces etc. are readily manufactured by the same technique.

What we claim and desire to secure by Letters Patent is:

1. A method of producing insulated pipeline components consisting of a fluid-conducting inner pipe, an outer casing of rigid plastic, and an intermediate insulating layer of foamed plastic material, which comprises centering the inner pipe in a mold cavity of a two-part mold with the pipe ends protruding therefrom; charging the mold cavity whose dimensions are greater than those of the inner pipe with plastic powder; closing the mold and heating it to melt the plastic powder and then rotating the mold to produce a plastic layer around the contact surfaces of the mold cavity; removing the inner pipe and the surrounding plastic jacket from the mold after the mold has cooled; supplying an expandable plastic material to the space between the inner pipe and the jacket and expanding the expandable plastic material to form said insulating layer.

2. A method as claimed in claim 1, wherein there is disposed on the inner pipe, before it is placed in the mold, a ring around said inner pipe at some distance from those points in the mold cavity from which the pipe ends protrude to prevent the molten plastic from flowing along the pipe.

3. A method as claimed in claim 1 or 2, characterized in that at least one hole is made in the rotationally molded jacket, preferbly in one of the surfaces adjacent the inner pipe, through which hole is expandable plastic material is injected into the space between the inner pipe and the jacket and is caused to expand, whereupon the hole is sealed.

4. A method as claimed in claims 1 or 2, characterized in that alarm wires are placed in the mold cavity together with the inner tube and with the ends of said wires protruding from said cavity.

* * * * *